US012682580B2

(12) United States Patent
Jenkins et al.

(10) Patent No.: US 12,682,580 B2
(45) Date of Patent: Jul. 14, 2026

(54) METHOD AND SYSTEM FOR AUGMENTED-REALITY-BASED OBJECT SELECTION AND ACTIONS FOR ACCENTUATION PROGRESSION

(71) Applicant: INTERNATIONAL BUSINESS MACHINES CORPORATION, Armonk, NY (US)

(72) Inventors: Jana H. Jenkins, Raleigh, NC (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 17/932,875

(22) Filed: Sep. 16, 2022

(65) Prior Publication Data

US 2024/0096028 A1 Mar. 21, 2024

(51) Int. Cl.
| | |
|---|---|
| *G06T 19/00* | (2011.01) |
| *G06F 3/01* | (2006.01) |
| *G06T 19/20* | (2011.01) |
| *G06V 10/74* | (2022.01) |
| *G06V 40/20* | (2022.01) |

(52) U.S. Cl.
CPC ............ *G06T 19/006* (2013.01); *G06F 3/017* (2013.01); *G06T 19/20* (2013.01); *G06V 10/761* (2022.01); *G06V 40/28* (2022.01); *G06V 2201/07* (2022.01)

(58) Field of Classification Search
CPC ..... G06T 19/006; G06T 19/20; G06V 10/761; G06V 40/28; G06V 2201/07; G06F 3/017
See application file for complete search history.

(56) References Cited

U.S. PATENT DOCUMENTS

| | | | |
|---|---|---|---|
| 9,152,317 B2 | 10/2015 | Larco | |
| 2012/0113223 A1 | 5/2012 | Hilliges | |
| 2014/0063058 A1* | 3/2014 | Fialho | ................... G06T 19/006 |
| | | | 345/633 |
| 2015/0293586 A1 | 10/2015 | Kritt | |
| 2016/0139762 A1 | 5/2016 | Meir | |

(Continued)

OTHER PUBLICATIONS

Luo, Gang, et al. "Registration of an on-axis see-through head-mounted display and camera system." Optical engineering 44.2 (2005) (Year: 2005).*

(Continued)

*Primary Examiner* — Oneal R Mistry
*Assistant Examiner* — Nhut Huy Pham
(74) *Attorney, Agent, or Firm* — Robert D. Bean

(57) ABSTRACT

According to one embodiment, a method, computer system, and computer program product for physical object selection within an augmented-reality environment is provided. The present invention may include identifying a plurality of physical objects in a camera feed from an augmented reality device; responsive to detecting one or more gestures of a user within the camera feed, rendering one or more virtual lines extrapolating from one or more fingers of the user within the augmented reality environment; and responsive to the user selecting a physical object of the plurality of physical objects, performing one or more actions with respect to the selected physical object.

20 Claims, 3 Drawing Sheets

(56) References Cited

U.S. PATENT DOCUMENTS

| | | | |
|---|---|---|---|
| 2017/0109938 A1 | 4/2017 | Hilliges | |
| 2017/0336882 A1 | 11/2017 | Tome | |
| 2018/0321816 A1 | 11/2018 | Bostick | |
| 2020/0167120 A1 | 5/2020 | Rakshit | |
| 2020/0225736 A1* | 7/2020 | Schwarz | G06T 19/006 |
| 2021/0097875 A1* | 4/2021 | Alexander, IV | G06F 3/0346 |
| 2021/0181857 A1 | 6/2021 | Marcolina | |
| 2021/0272373 A1* | 9/2021 | Fradet | G06F 3/1454 |
| 2022/0358715 A1* | 11/2022 | Tanner | G06T 15/205 |
| 2023/0046309 A1* | 2/2023 | May | G08G 5/80 |
| 2023/0141372 A1* | 5/2023 | Kamaraju | G06V 10/22 |
| | | | 382/103 |

OTHER PUBLICATIONS

Bole, Alan G., Alan D. Wall, and Andy Norris. "Radar and ARPA manual: radar, AIS and target tracking for marine radar users", Chapter 1, Butterworth-Heinemann, 2013 (Year: 2013).*

MathIsfun, "The Law of Cosines" https://www.mathsisfun.com/algebra/trig-cosine-law.html, a Wayback Machine copy captured 2021 is provided (Year: 2021).*

Angelopoulos, Anastasios Nikolas, et al. "Enhanced depth navigation through augmented reality depth mapping in patients with low vision." Scientific reports 9.1 (Year: 2019).*

Disclosed Anonymously, "Method and system for Automatically Defining Field of View and Frame Dimension Control," IP.com, Oct. 9, 2018, 3 pages, IP.com No. IPCOM000255686D, Retrieved from the Internet: <URL:https://priorart.ip.com/IPCOM/000255686>.

Disclosed Anonymously, "Method and system for Finger direction-based map navigation," IP.com, May 24, 2020, 4 pages, IP.com No. IPCOM000262366D, Retrieved from the Internet: <URL: https://priorart.ip.com/IPCOM/000262366>.

Disclosed Anonymously, "Method and system for virtually expandable stylus," IP.com, Apr. 13, 2016, 3 pages, IP.com No.

IPCOM000245849D, Retrieved from the Internet: <URL: https://priorart.ip.com/IPCOM/000245849>.

ECHO3D, "How to Add Hand Tracking to your AR App in 15 Minutes or Less," Medium.com [online], Dec. 10, 2020 [accessed on Sep. 2, 2022], Retrieved from the Internet: <URL: https://medium.com/echo3d/how-to-add-hand-tracking-to-your-ar-app-in-15-minutes-or-less-644e1c7bb710>.

Hardy, "Augmented reality unlocks remote technology support for a new normal," IBM.com [online], Jun. 16, 2020 [accessed on Sep. 2, 2022], 2 pages, Retrieved from the Internet: <URL: https://www.ibm.com/blogs/services/2020/06/16/augmented-reality-unlocks-remote-technology-support-for-a-new-normal/>.

IBM Support, "IBM Augmented Remote Assist," IBM.com [online], [accessed on Sep. 2, 2022], 2 pages, Retrieved from the Internet: <URL: https://www.ibm.com/support/pages/ibm-augmented-remote-assist>.

IBM Technology Support Services, "IBM Augmented Remote Assist," IBM.com, Aug. 2021, 4 pages, Retrieved from the Internet: <URL: https://www.ibm.com/support/pages/system/files/inline-files/IBM%20Augmented%20Remote%20Assist%20-%20Solution%20Brief.pdf>.

Pryss, et al., "Advanced Algorithms for Location-Based Smart Mobile Augmented Reality Applications, " Procedia Computer Science, 2016, pp. 97-104, vol. 94, Elsevier B.V., DOI: 10.1016/j.procs.2016.08.017, Retrieved from the Internet: <URL: https://www.sciencedirect.com/science/article/pii/S1877050916317574>.

Storr, "How Augmented Reality is Moving from Gaming to the Office," IBM.com [Think Blog], Jul. 26, 2018 [accessed on Sep. 2, 2022], 3 pages, Retrieved from the Internet: <URL: https://www.ibm.com/blogs/think/2018/07/see-see-app/>.

Whitlock, et al., "Interacting with Distant Objects in Augmented Reality," IEEE Virtual Reality [conference paper], Mar. 2018, 9 pages, ResearchGate, Reutlingen, DE, DOI:10.1109/VR.2018.8446381, Retrieved from the Internet: <URL: https://www.researchgate.net/publication/323583066_Interacting_with_Distant_Objects_in_Augmented_Reality>.

\* cited by examiner

100

200

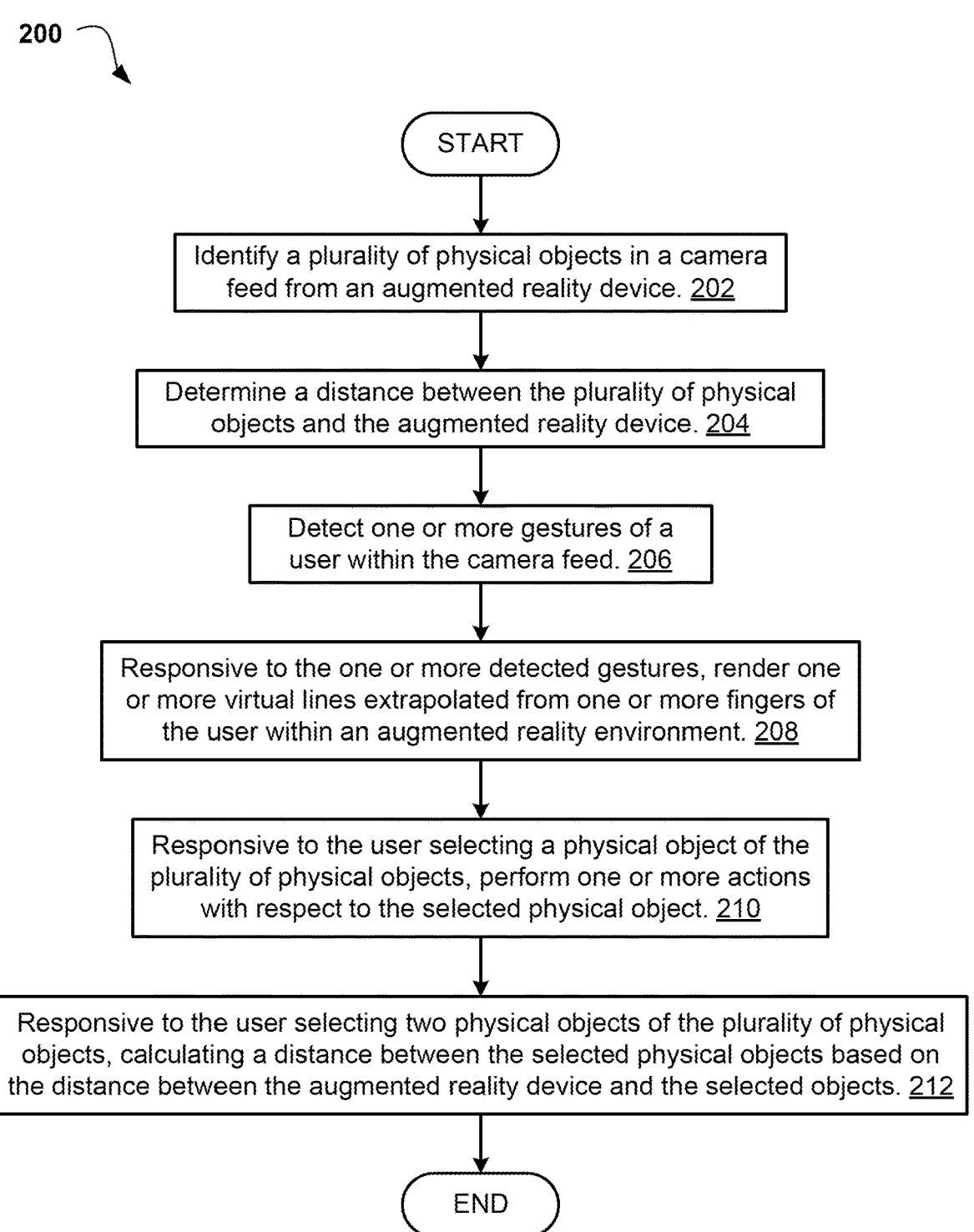

START

Identify a plurality of physical objects in a camera feed from an augmented reality device. 202

Determine a distance between the plurality of physical objects and the augmented reality device. 204

Detect one or more gestures of a user within the camera feed. 206

Responsive to the one or more detected gestures, render one or more virtual lines extrapolated from one or more fingers of the user within an augmented reality environment. 208

Responsive to the user selecting a physical object of the plurality of physical objects, perform one or more actions with respect to the selected physical object. 210

Responsive to the user selecting two physical objects of the plurality of physical objects, calculating a distance between the selected physical objects based on the distance between the augmented reality device and the selected objects. 212

END

METHOD AND SYSTEM FOR AUGMENTED-REALITY-BASED OBJECT SELECTION AND ACTIONS FOR ACCENTUATION PROGRESSION

BACKGROUND

The present invention relates, generally, to the field of computing, and more particularly to augmented reality.

Augmented reality (AR) is a modern computing technology that uses software to generate images, sounds, haptic feedback, and other sensations to integrate into a real-world environment to create a hybrid augmented reality environment, comprising both virtual and real-world elements. This augmented reality environment may be experienced by a user through an augmented reality device, which may be a general-purpose display-equipped computing device, such as a cell phone or tablet, or may comprise more specialized equipment, typically in the form of glasses or headsets where computer generated elements are overlaid onto a view of the real world by being projected or mapped onto a lens in front of a user's eyes. With the help of computer augmentation, information about the surrounding world of the user, as well as other digital elements overlaid onto the world, become interactive and digitally manipulable. This technology has the potential to transform countless aspects of human life, from construction to military training to buying groceries at the store.

SUMMARY

According to one embodiment, a method, computer system, and computer program product for physical object selection within an augmented-reality environment is provided. The present invention may include identifying a plurality of physical objects in a camera feed from an augmented reality device; responsive to detecting one or more gestures of a user within the camera feed, rendering one or more virtual lines extrapolating from one or more fingers of the user within the augmented reality environment; and responsive to the user selecting a physical object of the plurality of physical objects, performing one or more actions with respect to the selected physical object.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 is an operational flowchart illustrating an AR physical object selection process 200 according to at least one embodiment;

DETAILED DESCRIPTION

Figure 1:
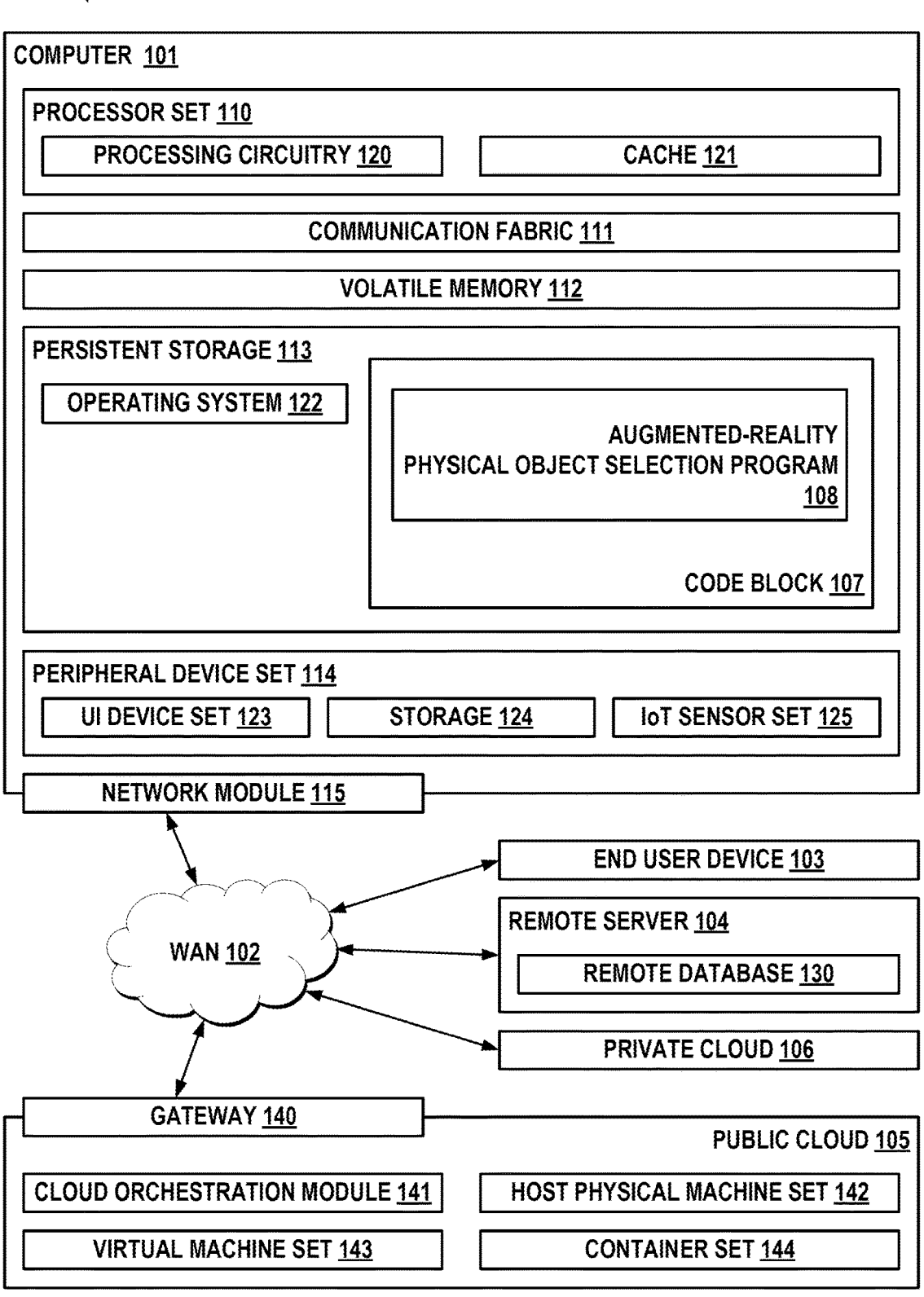
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to augmented reality. The following described exemplary embodiments provide a system, method, and program product to, among other things, use gestures to select physical objects in an augmented reality environment and execute commands pertaining to the physical objects.

Mixed reality represents the technology of merging real and virtual worlds such that physical and digital objects co-exist and interact in real time. Mixed reality does not exclusively take place in either the physical or virtual worlds but is a hybrid of reality and virtual reality; as such, mixed reality describes everything in the reality-virtuality continuum except for the two extremes, namely purely physical environments, and purely virtual environments. Accordingly, mixed reality includes augmented reality (AR) and virtual reality (VR). As previously described, augmented reality is a modern computing technology that uses software to generate images, sounds, haptic feedback, and other sensations which are integrated into a real-world environment to create a hybrid augmented reality environment, comprising both virtual and real-world elements. Virtual reality is a modern computing technology that creates a virtual environment that fully replaces the physical environment, such that a user experiencing a virtual reality environment cannot see objects or elements of the physical world; however, the virtual reality environment is anchored to real-world locations, such that the movement of players, virtual objects, virtual environmental effects and elements all occur relative to corresponding locations in the physical environment. Augmented reality is distinct from virtual reality in that an augmented reality environment augments the physical environment by overlaying virtual elements onto the physical environment, whereas a virtual reality environment fully replaces the physical environment with a virtual environment to completely immerse the user in a computer-generated world. In other words, a user within a virtual reality environment cannot see any real-world objects or environments, while a user within an augmented reality environment can see both the physical environment and virtual elements.

This augmented reality environment may be experienced by a user through an augmented reality device, which may be a general-purpose display-equipped computing device, such as a cell phone or tablet, or may comprise more specialized equipment, typically in the form of glasses or headsets where computer generated elements are overlaid onto a view of the real world by being projected or mapped onto a lens in front of a user's eyes. With the help of computer augmentation, information about the surrounding world of the user, as well as other digital elements overlaid onto the world, become interactive and digitally manipulable. An augmented reality device differs from a virtual reality device in that an augmented reality device must be equipped with a camera that is mounted, held, or otherwise positioned coaxially to a user's central axis of vision such that the feed from the camera approximates and overlaps the user's cone of vision; the feed from this camera is either modified with virtual elements and displayed to the user, or used to determine where in the user's vision virtual elements should be placed, and then projected onto a prism or glass substrate disposed in front of the user's eyes. A virtual reality device, by contrast, has no need of outward-facing cameras except to identify the location of the device, and often use other means of positioning such as infrared sensors.

While using an augmented reality device to experience an augmented reality environment, a user can see and interact with virtual objects overlaid onto the user's physical environment. A common method of interacting with virtual objects in both augmented reality environments and virtual reality environments is to first extrapolate a line from a controller; any virtual object that the extrapolated line touches may be selected, and may be manipulated at a distance, summoned, modified, or otherwise interacted with by the user. However, the art has struggled with selecting physical objects in the augmented reality environment; the reason for this is that the augmented reality or virtual reality system creates and controls virtual objects, and so has access to all data regarding virtual objects and can easily facilitate any desired interaction between a user and the virtual object. However, an augmented reality system has much more limited power over physical objects; the system cannot manipulate the physical object as it would a virtual object and must resort to less direct means to facilitate interaction between the user and the physical object. Nevertheless, it may be desirable for a user of an augmented reality system to select a physical object in an augmented reality environment, as a user may desire to interact with the physical object at a distance.

However, another challenge arises in selecting physical objects within an augmented reality environment; sometimes physical objects may be grouped together and may be at a distance such that an AR system may be unable to tell which physical object a user is indicating for selection, and therefore may be unable to accurately determine the user's selection. This may make selection impossible or impractical above certain distances from the user and may result in user frustration and a severe limitation of the selection function.

As such, it may be advantageous to, among other things, implement a system that can precisely select a physical object by extrapolating a pointer line from the user's fingers responsive to gestures by the user, and identify which physical objects are present in different distance ranges from the user and display the depth layers to the user to enable the user to precisely select objects at the desired distance from the user, enable the user to perform actions on selected physical objects. Therefore, the present embodiment has the capacity to improve the technical field of augmented reality by providing a precise means of selecting physical objects in an augmented reality environment, and enabling a user to interact with a physical object so selected at a distance to perform multiple helpful actions pertaining to the selected physical object, thereby enriching the user's experience and enhancing the user's capabilities within the augmented reality environment.

According to at least one embodiment, the invention is a method of identifying physical objects within camera feeds of an AR device, detecting gestures of a user within the camera feed of the AR device, extrapolating a virtual line from a finger of the user responsive to the detected gestures, selecting one of the physical objects based on the extrapolated virtual line, and performing one or more actions with respect to the selected physical object.

The AR device may be any device or combination of devices enabled to record real-world information that the system may overlay with computer-generated perceptual elements to create an augmented reality environment. The augmented reality device may operate and/or comprise a number of sensors such as a camera, microphone, accelerometer, et cetera, and/or may operate and/or comprise a number of user interface devices such as displays, touchscreens, speakers, et cetera. The AR device may utilize the sensors to record the actions, position, movements, and other properties of the user, to track the user's movement within and interactions with the augmented reality environment. The augmented reality device may utilize the user interface devices to convey the augmented reality environment to the user. In some embodiments, the augmented reality device may be a headset that is worn by the viewer.

The system may identify physical objects within the camera feeds of cameras operated or comprising the AR device via any object detection method. For example, the system may define features using a method such as the viola-jones object detection framework and then use a classifier such as a support vector machine to perform the classification and identify the object. In another example, the system may utilize a convolutional neural network to perform object detection without specifically defining features. The system may be pre-provided a list of physical objects that a user might encounter and wish to select, and/or the properties, metadata, names, and other information regarding the physical objects. In some embodiments of the invention, for example where the size of an object is known and the system only has access to a single camera, the system may utilize stadiametric rangefinding techniques to determine how far away an object is based on its actual size relative to its apparent size within the camera feed. In some embodiments of the invention, for example where the system is equipped with two or more cameras, the system may additionally or alternatively use motion parallax and/or triangulation to identify the distance of an object from the camera based on, respectively, the movement of the object relative to the cameras when the AR device and/or the object are in motion, and the triangle described by two of the cameras and the object. In some embodiments of the invention, for example where the AR device is equipped with specialized active rangefinding equipment such as lasers, sonar, ultrasonic ranging modules, the system may use LIDAR, sonar, and/or ultrasonic ranging techniques et cetera, respectively to identify the distance of the object from the AR device.

A gesture may be a movement and/or configuration of the user's hand, fingers, and/or arm that is associated with a particular command or meaning. For example, spreading apart the pointer finger and thumb may comprise a gesture that represents a command to zoom out of an image, while moving the pointer finger and thumb closer together may comprise a gesture that represents a command to zoom in on an image. The system may be pre-provided a list of gestures that the user may utilize, as well as the associated meaning. In some embodiments of the invention, the system may comprise a selectable mode which allows a user to enter new gestures into the list of gestures used by the system by performing the gestures in view of the camera of the AR device in response to a prompt. In this mode, the system may further allow users to update existing gestures or add existing gestures at new angles or using the opposite hand to improve the robustness of the gesture detection. The system may detect gestures by monitoring the camera feed from the AR device and using algorithms such as 3D model-based algorithms or skeletal based algorithms to model the user's hands and arms and identify when the motion and/or configuration of the user's hands and/or arms match motions and/or configurations associated with known gestures. In some embodiments of the invention, the system may use an appearance-based model to derive the parameters of the user's hand and/or arm motion and/or configuration directly from images rather than relying on a spatial model and identify a gesture if the parameters match those of a known gesture.

The system may identify when a user wants to select something by determining that the user is performing a gesture associated with a select command. For example, the gesture may comprise the user pointing in a direction with an extended pointer finger while curling the other fingers for a predetermined period of time. Responsive to determining that the user wants to select something, the system may render a virtual line that is collinear with the axis described by a finger of the user, and which originates from the tip of the user's finger and extends a predetermined distance. The virtual line may be a graphical element overlaid onto the user's vision within the augmented reality environment, and the system may continuously update the virtual line to maintain its position relative to the axis and position of the user's finger. In some embodiments of the invention, for example where the user desires to point towards multiple objects and where the user has indicated such desire to the system through a corresponding gesture, the system may render virtual lines pointing from multiple fingers of the user. The system may cease rendering the virtual line responsive to identifying that the user has performed a gesture that indicates that the user no longer wishes to select an object.

In some embodiments of the invention, the system may, responsive to determining that the user wants to select a physical object, and based on the distance of the identified physical objects from the AR device, overlay multiple concentric non-overlapping depth ranges of uniform width onto the augmented reality environment, where the depth ranges represent bands at specific ranges of distance from the AR device, where each band may comprise physical objects, and the outermost band comprising the furthest physical objects that the system has identified that are still within a range where they are visible to a camera on the AR device. The depth ranges may be centered on the AR device. The user may select a depth range representing the band of distance from the AR device that corresponds to the location of the physical object the user wants to select; responsive to the user selecting a depth range, the system may highlight and may enable selection of all physical objects located within the selected depth range and/or disable selection of all physical objects outside of the selected depth range, such that the user, for example, does not accidentally select physical objects that are visually tightly grouped relative to the AR device but which are in fact significant distances apart. The system may overlay data pertaining to the distances of the depth ranges from the AR device onto the augmented reality environment. In some embodiments, the system may select all physical objects within the depth range selected by the user. The length of the virtual line may be adjusted based on the selected depth range.

The system may recognize a physical object as being selected by the user by determining that the user has pointed the virtual line at a previously identified physical object for a predetermined period of time. Responsive to determining that an object has been selected, the system may render a menu in the AR environment, where the menu comprises a number of selectable entries corresponding with a number of actions that the user may order the system to take with respect to the physical object. These actions may include, for example, zooming in on the physical object by enlarging the physical object in camera footage recorded by the augmented reality device and overlaying a virtual image of the enlarged object onto its physical counterpart in the user's vision, capturing images of the physical object, manipulating or modifying the view for contextual usage, or by adding virtual elements to provide information or visual emphasis regarding the physical object. The user may select the menu with the virtual line. In some embodiments of the invention, the user may interact with the menu using gestures to select individual entries.

In some embodiments of the invention, for example where the user has selected two physical objects at the same time using two fingers, the system may measure the angle described by the two fingers used by the user to select the objects using gesture recognition techniques, and use this angle in conjunction with the distance between each of the two physical objects and the AR device acquired through rangefinding techniques to calculate the distance between the two selected objects using the law of cosines. The system may graphically overlay the angle made by the fingers onto the user's vision, and/or may overlay the distance between the two physical objects onto the user's vision.

In some embodiments of the invention, multiple users may participate within a single augmented reality environment, which in some embodiments may comprise multiple shared augmented reality environments, such that the users are all capable of seeing and interacting with each other, and capable of seeing and interacting with the virtual elements within each other's augmented reality environments, such as virtual lines. In some embodiments of the invention, a user may indicate, via a dedicated gesture, that that user wishes to show a physical object to another user selected via gesture or by indication with the virtual line; the system may accordingly zoom in on a physical object selected by the user and display the enhanced object to both the user and the selected additional user. The system may also display information regarding the selected physical object to both the user and the selected additional user, and/or take a photograph and share it with the selected additional user. In some embodiments of the invention, the system may allow all consenting users within the augmented reality environment to access the camera feeds from the AR devices of all other consenting users; the system may utilize the camera feeds to create a single unified list of all physical objects visible to any consenting users, may utilize the multiple camera feeds to perform triangulation and/or to cross-reference and/or average distances and locations of physical objects to improve the accuracy of the distances and locations of the physical objects. The system may, responsive to determining that a user has selected a physical object to zoom in on which is far away from that user, identify that object within one or more camera feeds from AR devices of additional users within the augmented reality environment that are closer to the selected physical object, and utilize those camera feeds to improve the fidelity of the zoomed image displayed to the user.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product to use gestures to select physical objects in an augmented reality environment and execute commands pertaining to the physical objects.

Referring now to FIG. 1, computing environment 100 contains an example of an environment for the execution of at least some of the computer code involved in performing the inventive methods, such as AR physical object selection program 108. In addition to block 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 107, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 107 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 107 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles, augmented reality headsets, and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications, including biometric sensors. For example, one sensor may be an infrared camera and another sensor may be a heart rate monitor.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the AR physical object selection program 108 may be a program enabled to use gestures to select physical objects in an augmented reality environment and execute commands pertaining to the physical objects. The AR physical object selection program 108 may, when executed, cause the computing environment 100 to carry out an AR physical object selection method. The AR physical object selection method is explained in further detail below with respect to FIG. 2.

Referring now to FIG. 2, an operational flowchart illustrating an AR physical object selection process 200 is depicted according to at least one embodiment. At 202, the AR physical object selection program 108 identifies a plurality of physical objects in a camera feed from an augmented reality device. The physical object may be a tangible physical object existing in the physical world, as distinct from a virtual object, which is intangible and exists only within a virtual or augmented reality environment. The AR physical object selection program 108 may identify the physical objects within the camera feeds of cameras operated by or comprising the AR device via any object detection method.

At 204, the AR physical object selection program 108 determines a distance between the plurality of physical objects and the augmented reality device. The AR physical object selection program 108 may be pre-provided a list of physical objects that a user might encounter and wish to select, and/or the properties, metadata, names, and other information regarding the physical objects. In some embodiments of the invention, for example where the size of an object is known and the AR physical object selection program 108 only has access to a single camera, the AR physical object selection program 108 may utilize stadiametric rangefinding techniques to determine how far away an object is from the AR device based on its actual size relative to its apparent size within the camera feed. In some embodiments of the invention, for example where the AR physical object selection program 108 is equipped with two or more cameras, the AR physical object selection program 108 may additionally or alternatively use motion parallax and/or triangulation to identify the distance of an object from the camera based on, respectively, the movement of the object relative to the cameras when the AR device and/or the object are in motion, and the triangle described by two of the cameras and the object. In some embodiments of the invention, for example where the AR device is equipped with specialized active rangefinding equipment such as lasers, sonar, ultrasonic ranging modules, the AR physical object selection program 108 may use LIDAR, sonar, and/or ultrasonic ranging techniques et cetera, respectively to identify the distance of the object from the AR device.

At 206, the AR physical object selection program 108 detects one or more gestures of a user within the camera feed. A gesture may be a movement and/or configuration of the user's hand, fingers, and/or arm that is associated with a particular command or meaning. For example, spreading apart the pointer finger and thumb may comprise a gesture that represents a command to zoom out of an image, while moving the pointer finger and thumb closer together may comprise a gesture that represents a command to zoom in on an image. The AR physical object selection program 108 may be pre-provided a list of gestures that the user may utilize, as well as the associated meaning. In some embodiments of the invention, the AR physical object selection program 108 may comprise a selectable mode which allows a user to enter new gestures into the list of gestures used by the AR physical object selection program 108 by performing the gestures in view of the camera of the AR device in response to a prompt. In this mode, the AR physical object selection program 108 may further allow users to update existing gestures or add existing gestures at new angles or using the opposite hand to improve the robustness of the gesture detection. The AR physical object selection program 108 may detect gestures by monitoring the camera feed from the AR device and using algorithms such as 3D model-based algorithms or skeletal based algorithms to model the user's hands and arms and identify when the motion and/or configuration of the user's hands and/or arms match motions and/or configurations associated with known gestures. In some embodiments of the invention, the AR physical object selection program 108 may use an appearance-based model to derive the parameters of the user's hand and/or arm motion and/or configuration directly from images rather than relying on a spatial model and identify a gesture if the parameters match those of a known gesture.

At 208, the AR physical object selection program 108 renders one or more virtual lines extrapolated from one or more fingers of the user within an augmented reality environment responsive to the one or more detected gestures. The AR physical object selection program 108 may identify when a user wants to select something by determining that the user is performing a gesture associated with a select command. Responsive to determining that the user wants to select something, the AR physical object selection program 108 may render a virtual line that is collinear with the axis described by a finger of the user, and which originates from the tip of the user's finger and extends a predetermined distance. The virtual line may be a graphical element overlaid onto the user's vision within the augmented reality environment, and the AR physical object selection program 108 may continuously update the virtual line to maintain its position relative to the axis and position of the user's finger. In some embodiments of the invention, for example where the user desires to point towards multiple objects and where the user has indicated such desire to the AR physical object selection program 108 through a corresponding gesture, the AR physical object selection program 108 may render virtual lines pointing from multiple fingers of the user. The AR physical object selection program 108 may cease rendering the virtual line responsive to identifying that the user has performed a gesture that indicates that the user no longer wishes to select an object.

In some embodiments of the invention, the AR physical object selection program 108 may, responsive to determining that the user wants to select a physical object, and based on the distance of the identified physical objects from the AR device, overlay multiple concentric non-overlapping depth ranges of uniform width onto the augmented reality environment, where the depth ranges represent bands at specific ranges of distance from the AR device, where each band may comprise physical objects, and the outermost band comprising the furthest physical objects that the AR physical object selection program 108 has identified that are still within a range where they are visible to a camera on the AR device. The user may select a depth range representing the band of distance from the AR device that corresponds to the location of the physical object the user wants to select; responsive to the user selecting a depth range, the AR physical object selection program 108 may highlight and may enable selection of all physical objects located within the selected depth range and/or disable selection of all physical objects outside of the selected depth range, such that the user, for example, does not accidentally select physical objects that are visually tightly grouped relative to the AR device but which are in fact significant distances apart. The AR physical object selection program 108 may overlay data pertaining to the distances of the depth ranges from the AR device onto the augmented reality environment. In some embodiments, the AR physical object selection program 108 may select all physical objects within the depth range selected by the user. The length of the virtual line may be adjusted based on the selected depth range.

At 210, the AR physical object selection program 108 performs one or more actions with respect to the selected physical object responsive to the user selecting a physical object of the plurality of physical objects. The AR physical object selection program 108 may recognize a physical object as being selected by the user by determining that the user has pointed the virtual line at a previously identified physical object for a predetermined period of time. Responsive to determining that an object has been selected, the AR physical object selection program 108 may render a menu in the AR environment, where the menu comprises a number of selectable entries corresponding with a number of actions that the user may order the AR physical object selection program 108 to take with respect to the physical object. These actions may include, for example, zooming in on the physical object by enlarging the physical object in camera footage recorded by the augmented reality device and overlaying a virtual image of the enlarged object onto its physical counterpart in the user's vision, capturing images of the physical object, manipulating or modifying the view for contextual usage, or by adding virtual elements to provide information or visual emphasis regarding the physical object.

At 212, the AR physical object selection program 108 determines a distance between the selected physical objects based on the distance between the augmented reality device and the selected objects responsive to the user selecting two physical objects of the plurality of physical objects. The AR physical object selection program 108 may measure the angle described by the two fingers used by the user to select the objects using gesture recognition techniques and use this angle in conjunction with the distance between each of the two physical objects and the AR device acquired through rangefinding techniques to identify the distance between the two selected objects using the law of cosines.

Figure 3:
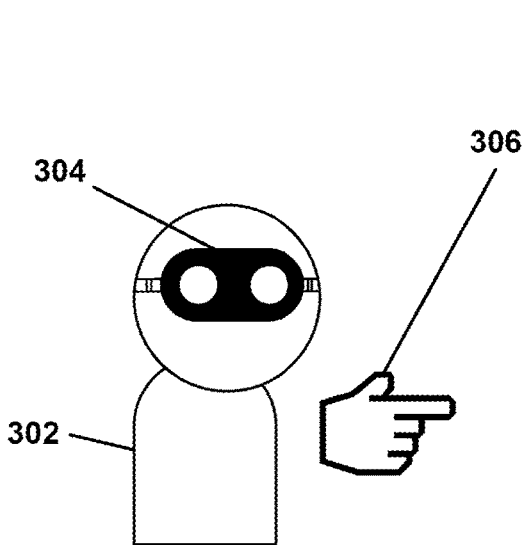
FIG. 3 is a diagram illustrating an exemplary use case of AR physical object selection process 200 according to at least one embodiment.

Referring now to FIG. 3, a diagram illustrating an exemplary use case 300 of AR physical object selection process 200 is depicted according to at least one embodiment. Here a user 302 wearing an augmented reality headset 304 desires to select an object, a diamond 308 lying amongst a number of trees 310. User 302 accordingly performs a pointing gesture 306. The augmented reality headset 304, equipped with a camera, recognizes the gesture as indicating that the user intends to enter selection mode.

Figure 4:
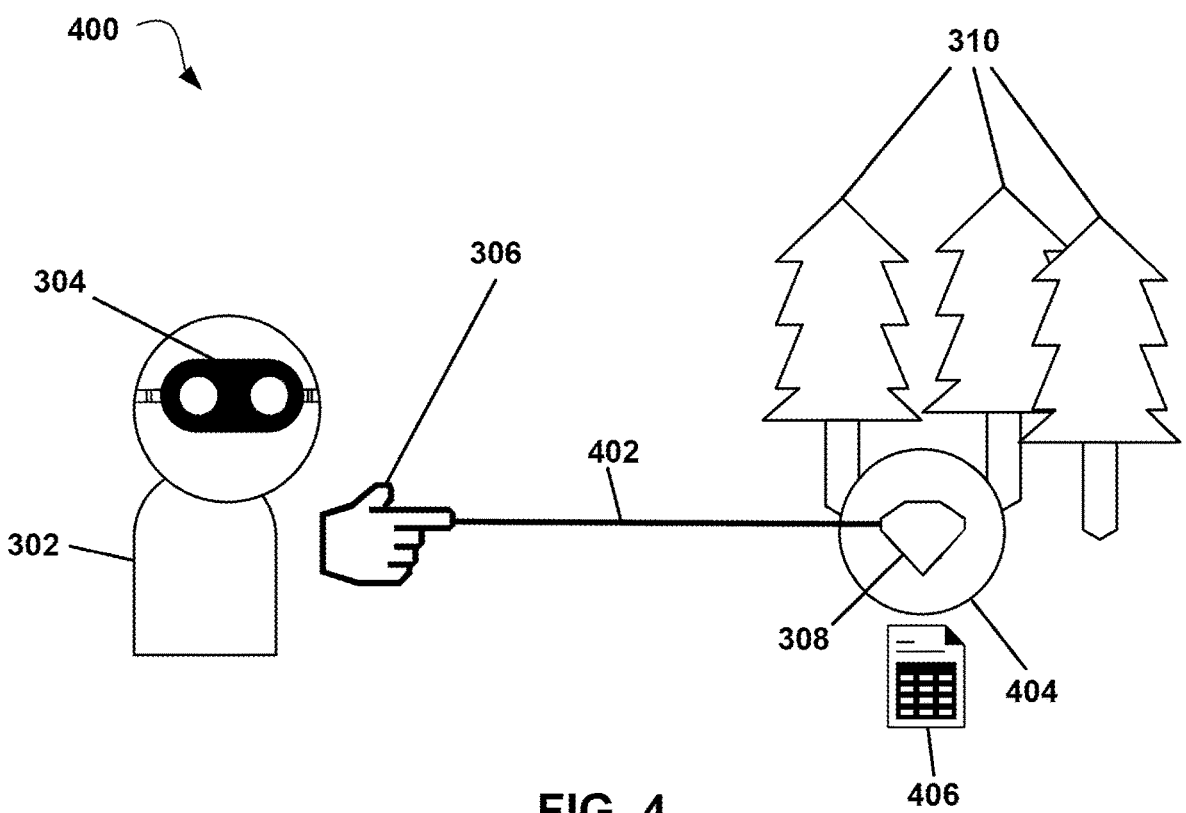
FIG. 4 is a diagram illustrating an exemplary use case of AR physical object selection process 200 according to at least one embodiment.

Referring now to FIG. 4, a diagram illustrating an exemplary use case 400 of AR physical object selection process 200 is depicted according to at least one embodiment. Here a user 302 wearing an augmented reality headset 304 desires to select an object, a diamond 308 lying amongst a number of trees 310. User 302 had performed a pointing gesture 306, which was recognized by the augmented reality headset 304; accordingly, AR physical object selection program 108 renders a virtual line 402 within the augmented reality environment generated by augmented reality headset 304, which extends from the tip of the finger user 302 was using to point. User 302 indicates diamond 308 with the virtual line 402 for a threshold period of time; the AR physical object selection program 108 accordingly recognizes that the user intends to select the diamond 308 and highlights the diamond 308 with a circle 404. The AR physical object selection program 108 may further render a menu 406, which may comprise information regarding the diamond, and a list of actions that the user 302 can take with respect to the diamond 308, such as zooming, taking a picture, et cetera.

It may be appreciated that FIGS. 2-4 provides only illustrations of individual implementations and do not imply any limitations with regard to how different embodiments may be implemented. Many modifications to the depicted environments may be made based on design and implementation requirements. For example, one skilled in the art would recognize the invention to cover embodiments where multiple users participate within a single augmented reality environment such that the users are all capable of seeing and interacting with each other, and capable of seeing and interacting with the virtual elements within each other's augmented reality environments, such as virtual lines. In some embodiments of the invention, a user may indicate, via a dedicated gesture, that that user wishes to show a physical object to another user selected via gesture or by indication with the virtual line; the AR physical object selection program 108 may accordingly zoom in on a physical object selected by the user and display the enhanced object to both the user and the selected additional user. The AR physical object selection program 108 may also display information regarding the selected physical object to both the user and the selected additional user, and/or take a photograph and share it with the selected additional user. In some embodiments of the invention, the AR physical object selection program 108 may allow all consenting users within the augmented reality environment to access the camera feeds from the AR devices of all other consenting users; the AR physical object selection program 108 may utilize the camera feeds to create a single unified list of all physical objects visible to any consenting users, may utilize the multiple camera feeds to perform triangulation and/or to cross-reference and/or average distances and locations of physical objects to improve the accuracy of the distances and locations of the physical objects. The AR physical object selection program 108 may, responsive to determining that a user has selected a physical object to zoom in on which is far away from that user, identify that object within one or more camera feeds from AR devices of additional users within the augmented reality environment that are closer to the selected physical object, and utilize those camera feeds to improve the fidelity of the zoomed image displayed to the user.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for physical object selection within an augmented reality environment, the method comprising:

identifying a plurality of physical objects in a camera feed from an augmented reality device;

determining a distance between the physical objects and the augmented reality device;

responsive to detecting one or more gestures of a user within the camera feed, overlaying a plurality of concentric non-overlapping depth ranges onto the augmented reality environment, where the depth ranges represent bands at specific ranges of distance from the augmented reality device;

responsive to the user selecting one of the plurality of depth ranges, enabling selection of one or more of the physical objects present within the selected depth range; and responsive to the user selecting one of the one or more physical objects present within the selected depth range, performing one or more actions with respect to the selected physical object.

2. The method of claim 1, further comprising:

determining a distance between the plurality of physical objects and the augmented reality device.

3. The method of claim 2, further comprising:

responsive to the user selecting two physical objects of the plurality of physical objects, calculating a distance between the two selected objects based on the determined distance and an angle described by two of the user's fingers.

4. The method of claim 2, further comprising:

rendering, based on the determined distance, a plurality of uniform concentric virtual depth ranges centered on the augmented reality device and comprising the plurality of physical objects.

5. The method of claim 1, wherein the one or more actions comprise a zoom function which is based on camera feeds from a plurality of additional users within the augmented reality environment.

6. The method of claim 1, wherein the action is performed for the user and for one or more additional users selected by the user.

7. The method of claim 1, wherein the camera feed is generated by a camera integrated into the augmented reality device that is mounted coaxially to a central axis of vision of the user.

8. A computer system for physical object selection within an augmented reality environment, the computer system comprising:

one or more processors, one or more computer readable memories, one or more augmented reality devices, one or more sensors, one or more computer readable storage medium, and program instructions stored on at least one of the one or more computer readable storage medium for execution by at least one of the one or more processors via at least one of the one or more memories, wherein the computer system is capable of performing a method comprising:

identifying a plurality of physical objects in a camera feed from an augmented reality device;

determining a distance between the physical objects and the augmented reality device;

responsive to detecting one or more gestures of a user within the camera feed, overlaying a plurality of concentric non-overlapping depth ranges onto the augmented reality environment, where the depth ranges represent bands at specific ranges of distance from the augmented reality device;

responsive to the user selecting one of the plurality of depth ranges, enabling selection of one or more of the physical objects present within the selected depth range; and responsive to the user selecting one of the one or more physical objects present within the selected depth range, performing one or more actions with respect to the selected physical object.

9. The computer system of claim 8, further comprising:

determining a distance between the plurality of physical objects and the augmented reality device.

10. The computer system of claim 9, further comprising:

responsive to the user selecting two physical objects of the plurality of physical objects, calculating a distance between the two selected objects based on the determined distance and an angle described by two of the user's fingers.

11. The computer system of claim 9, further comprising:

rendering, based on the determined distance, a plurality of uniform concentric virtual depth ranges centered on the augmented reality device and comprising the plurality of physical objects.

12. The computer system of claim 8, wherein the one or more actions comprise a zoom function which is based on camera feeds from a plurality of additional users within the augmented reality environment.

13. The computer system of claim 8, wherein the action is performed for the user and for one or more additional users selected by the user.

14. The computer system of claim 8, wherein the camera feed is generated by a camera integrated into the augmented reality device that is mounted coaxially to a central axis of vision of the user.

15. A computer program product for physical object selection within an augmented reality environment, the computer program product comprising:

one or more computer readable storage media and program instructions stored on at least one of the one or more computer readable storage media, the program instructions executable by a processor to cause the processor to perform a method comprising:

identifying a plurality of physical objects in a camera feed from an augmented reality device;

determining a distance between the physical objects and the augmented reality device;

responsive to detecting one or more gestures of a user within the camera feed, overlaying a plurality of concentric non-overlapping depth ranges onto the augmented reality environment, where the depth ranges represent bands at specific ranges of distance from the augmented reality device;

responsive to the user selecting one of the plurality of depth ranges, enabling selection of one or more of the physical objects present within the selected depth range; and responsive to the user selecting one of the one or more physical objects present within the selected depth range, performing one or more actions with respect to the selected physical object.

16. The computer program product of claim 15, further comprising:

determining a distance between the plurality of physical objects and the augmented reality device.

17. The computer program product of claim 16, further comprising:

responsive to the user selecting two physical objects of the plurality of physical objects, calculating a distance between the two selected objects based on the determined distance and an angle described by two of the user's fingers.

18. The computer program product of claim 16, further comprising:

rendering, based on the determined distance, a plurality of uniform concentric virtual depth ranges centered on the augmented reality device and comprising the plurality of physical objects.

19. The computer program product of claim 15, wherein the one or more actions comprise a zoom function which is based on camera feeds from a plurality of additional users within the augmented reality environment.

20. The computer program product of claim 15, wherein the action is performed for the user and for one or more additional users selected by the user.

* * * * *